United States Patent
Smith et al.

(10) Patent No.: US 10,972,306 B2
(45) Date of Patent: Apr. 6, 2021

(54) BUILDING MANAGEMENT SYSTEM HAVING EVENT REPORTING

(71) Applicant: Carrier Corporation, Palm Beach Gardens, FL (US)

(72) Inventors: Fabrizio Smith, Rome (IT); Daniele Alessandrelli, Dublin (IE); Christos Sofronis, Rome (IT); Alberto Ferrari, Rome (IT); Jason Higley, East Rochester, NY (US); Bhabani Sankar Nanda, Orissa (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/463,191

(22) PCT Filed: Nov. 21, 2017

(86) PCT No.: PCT/US2017/062778
§ 371 (c)(1),
(2) Date: May 22, 2019

(87) PCT Pub. No.: WO2018/098148
PCT Pub. Date: May 31, 2018

(65) Prior Publication Data
US 2019/0379555 A1 Dec. 12, 2019

(30) Foreign Application Priority Data
Nov. 23, 2016 (IN) .............................. 201611039964

(51) Int. Cl.
*H04L 12/28* (2006.01)
*G06F 16/2452* (2019.01)
(Continued)

(52) U.S. Cl.
CPC .......... *H04L 12/2823* (2013.01); *G05B 15/02* (2013.01); *G06F 16/24522* (2019.01); *H04L 41/22* (2013.01); *G05B 2219/2642* (2013.01)

(58) Field of Classification Search
CPC ................. H04L 12/2823; H04L 41/22; G06F 16/24522; G05B 15/02; G05B 2219/2642
See application file for complete search history.

(56) References Cited

U.S. PATENT DOCUMENTS

| | | |
|---|---|---|
| 6,167,316 A | 12/2000 | Loudeman et al. |
| 6,973,410 B2 | 12/2005 | Siegel |

(Continued)

FOREIGN PATENT DOCUMENTS

| | | |
|---|---|---|
| CN | 103440309 A | 12/2013 |
| CN | 105205148 A | 12/2015 |

(Continued)

OTHER PUBLICATIONS

International Search Report and Written Opinion for application PCT/US2017/062778, dated Feb. 19, 2018, 13 pages.

(Continued)

*Primary Examiner* — Amine Benlagsir
(74) *Attorney, Agent, or Firm* — Cantor Colburn LLP

(57) ABSTRACT

A building management system includes a building system interface (24) configured to access a building system (20); an event service module (26) configured to access event data in the building system through the building system interface (24); a knowledge base (12) providing a model of the building system, the model including semantic descriptions of the event data, the semantic descriptions of the event data being arranged in an ontology; a semantic service module (30) in communication with the knowledge base (12); and a user interface (14) in communication with the semantic service module (30) and the event service module (26), the (Continued)

user interface (14) generating a user request to create an event filter having a filter criterion and report event data matching the filter criterion.

8 Claims, 5 Drawing Sheets

(51) Int. Cl.
*G05B 15/02* (2006.01)
*H04L 12/24* (2006.01)

(56) References Cited

U.S. PATENT DOCUMENTS

| | | |
|---|---|---|
| 7,734,572 B2 | 6/2010 | Wiemeyer et al. |
| 7,895,257 B2 | 2/2011 | Helal et al. |
| 8,117,233 B2 | 2/2012 | Liu et al. |
| 8,234,704 B2 | 7/2012 | Ghai et al. |
| RE43,803 E | 11/2012 | Frank et al. |
| 8,516,016 B2 | 8/2013 | Park et al. |
| 8,522,195 B2 | 8/2013 | Miloslavsky et al. |
| 8,682,921 B2 | 3/2014 | Park et al. |
| 8,818,930 B2 | 8/2014 | Yanase |
| 9,111,088 B2 | 8/2015 | Ghai et al. |
| 9,116,978 B2 | 8/2015 | Park et al. |
| 9,157,647 B2 | 10/2015 | Leen et al. |
| 9,189,527 B2 | 11/2015 | Park et al. |
| 2002/0072982 A1 | 6/2002 | Barton et al. |
| 2007/0236346 A1* | 10/2007 | Helal ............... H04L 43/12 340/539.22 |
| 2008/0228812 A1 | 9/2008 | Oglesby et al. |
| 2009/0177634 A1 | 7/2009 | Behrendt et al. |
| 2010/0324927 A1 | 12/2010 | Tinsley |
| 2010/0324962 A1* | 12/2010 | Nesler ............. G06Q 30/0206 705/7.36 |
| 2011/0078107 A1 | 3/2011 | Almeida et al. |
| 2011/0088000 A1 | 4/2011 | Mackay |
| 2011/0273283 A1 | 11/2011 | Schmuttor |
| 2012/0011126 A1 | 1/2012 | Park et al. |
| 2012/0110158 A1 | 5/2012 | Koch et al. |
| 2012/0203806 A1 | 8/2012 | Panushev |
| 2013/0218349 A1 | 8/2013 | Coogan et al. |
| 2013/0238795 A1 | 9/2013 | Geffin et al. |
| 2013/0261833 A1 | 10/2013 | Meghani et al. |
| 2013/0268317 A1 | 10/2013 | Mattila |
| 2013/0339104 A1 | 12/2013 | Bose |
| 2014/0149249 A1 | 5/2014 | Goad et al. |
| 2014/0207759 A1 | 7/2014 | Park et al. |
| 2014/0337010 A1 | 11/2014 | Akolkar et al. |
| 2014/0344718 A1 | 11/2014 | Rapaport et al. |
| 2015/0088312 A1 | 3/2015 | Lo et al. |
| 2015/0113462 A1 | 4/2015 | Chen et al. |
| 2015/0253748 A1 | 9/2015 | Brun et al. |
| 2015/0294543 A1 | 10/2015 | Ricks |
| 2016/0026631 A1 | 1/2016 | Salam et al. |
| 2016/0197769 A1 | 7/2016 | Britt et al. |
| 2017/0366414 A1* | 12/2017 | Hamilton ............ H04L 12/2823 |

FOREIGN PATENT DOCUMENTS

| | | |
|---|---|---|
| CN | 105677795 A | 6/2016 |
| EP | 2043009 A1 | 4/2009 |
| EP | 2701357 A1 | 2/2014 |
| WO | 2005052720 A2 | 6/2005 |
| WO | 2007098468 A1 | 8/2007 |
| WO | 2012091541 A1 | 7/2012 |
| WO | 2012177630 A1 | 12/2012 |
| WO | 2013173108 A1 | 11/2013 |
| WO | 2015011446 A1 | 1/2015 |

OTHER PUBLICATIONS

International Search Report and Written Opinion for application PCT/US2017/062783, dated Feb. 1, 2018, 12 pages.

* cited by examiner

BUILDING MANAGEMENT SYSTEM HAVING EVENT REPORTING

TECHNICAL FIELD

The subject matter disclosed herein relates generally to building management systems, and more particularly to a building management system that provides for the creation of an event filter and the reporting of event data matching the event filter.

BACKGROUND

A building management system may be used to detect the occurrence of events at a building system by processing building system data. For example, in an HVAC application, a building management system may be used to monitor existing chiller water temperatures and to issue an event in the form of an alarm if the chiller water temperature exceeds a limit. In current building installations, each system (HVAC, security, safety, and building transportation) provides a huge number of events. Event data provided by devices belonging to different systems can only be accessed and controlled through heterogeneous, often proprietary protocols, and/or managed by isolated building management systems. As a result, accessing event data can be burdensome, given the multitude of protocols and isolated nature of the diverse building systems.

BRIEF DESCRIPTION

According to one embodiment, a building management system includes a building system interface configured to access a building system; an event service module configured to access event data in the building system through the building system interface; a knowledge base providing a model of the building system, the model including semantic descriptions of the event data, the semantic descriptions of the event data being arranged in an ontology; a semantic service module in communication with the knowledge base; and a user interface in communication with the semantic service module and the event service module, the user interface generating a user request to create an event filter having a filter criterion and report event data matching the filter criterion.

In addition to one or more of the features described above, or as an alternative, further embodiments may include wherein the semantic service module accesses the knowledge base to retrieve event data entries matching the event filter.

In addition to one or more of the features described above, or as an alternative, further embodiments may include wherein the knowledge base provides metadata from event data entries matching the event filter to the user interface.

In addition to one or more of the features described above, or as an alternative, further embodiments may include wherein the user interface sends a request to the event service module to report event data matching the filter criterion.

In addition to one or more of the features described above, or as an alternative, further embodiments may include wherein the event service module sends a request to the building system interface to retrieve event data matching the filter criterion.

In addition to one or more of the features described above, or as an alternative, further embodiments may include wherein the building system interface sends event data matching the filter criterion to the event service module.

In addition to one or more of the features described above, or as an alternative, further embodiments may include wherein the event service module sends the event data matching the filter criterion to the user interface.

In addition to one or more of the features described above, or as an alternative, further embodiments may include wherein the user interface accesses the semantic service module to convert the event data matching the filter criterion from a building system format to a semantic format.

In addition to one or more of the features described above, or as an alternative, further embodiments may include wherein the semantic service module forwards the event data matching the filter criterion in the semantic format to the user interface.

In addition to one or more of the features described above, or as an alternative, further embodiments may include wherein the user request to create the event filter includes a reporting period.

In addition to one or more of the features described above, or as an alternative, further embodiments may include wherein the event service module sends the event data matching the filter criterion to the user interface in response to the reporting period.

Technical effects of embodiments of the disclosure include the ability to create an event filter having a filter criterion and report event data matching the filter criterion to user.

These and other advantages and features will become more apparent from the following description taken in conjunction with the drawings.

DETAILED DESCRIPTION

Figure 1:
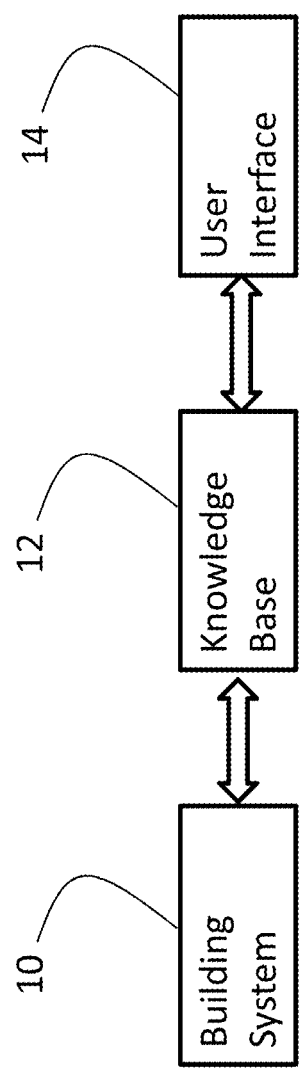
FIG. 1 depicts a building management system in an embodiment.

FIG. 1 is a high-level depiction of a building management system in an embodiment. A building system 10 corresponds to the physical building system(s) that are managed by the building management system. The building system 10 may include building systems across a disparate set of domains such as HVAC, building transportation, security, safety, etc. The building system 10 incorporates building system data which includes a wide variety of data types, including but not limited to, how building system elements are arranged, measurements of variables, control values for set points, etc. One component of the building system data is event data, which indicates that a certain event has occurred (e.g., pressure exceeds a limit, elevator car emergency stop, fire alarm indicated, unauthorized access detected, etc.)

A knowledge base 12 is provided to store building system data, including event data. The knowledge base 12 may be embodied on a microprocessor-based device having a memory, such as a computer server. The building system data from building system 10 is processed to form semantic descriptions of the building system data. The semantic descriptions of the building system data are stored in ontologies in knowledge base 12. In addition to variables and control values, the knowledge base 12 includes a model of the building system 10 across different domains (HVAC, building transportation, security, safety, etc.). Through the semantic descriptions and the ontology, entities (e.g., equipment, devices, zones, spaces, event sources, data sources, sensors, commands, configuration parameters) and their relationships are defined in the knowledge base 12.

A user interface 14 is used to access the knowledge base 12 in response to user queries. The user interface 14 may be implemented using an application program interface (API) accessible over a network such as a LAN, WAN, global network (e.g., Internet), etc. The user interface 14 provides an interface for creating an event filter and reporting event data matching the event filter criterion.

Figure 2:
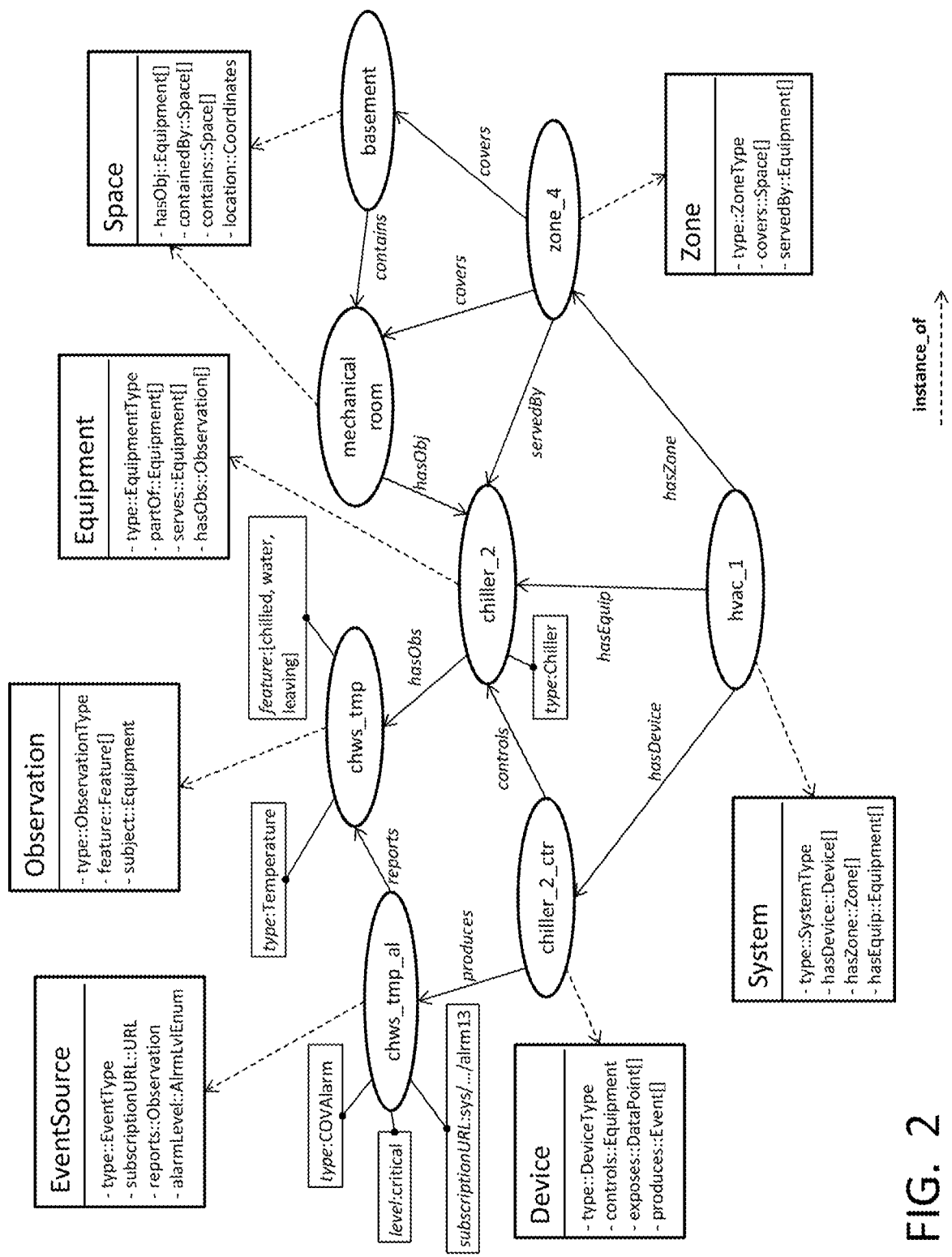
FIG. 2 depicts entries in the knowledge base in an embodiment.

FIG. 2 illustrates example entries in the knowledge base 12. The entries correspond to semantic descriptions of building system data 20 arranged according to the conceptual model provided by the ontology. Each entry in the knowledge base 12 may correspond to a variety of data types, such as a data point, property, device, equipment, etc. The relationships between the semantic descriptions of the building system data 20 provide the model of the building system 10 by identifying how elements are organized and related. The entries in the knowledge base 12 may be identified using unique identifiers, such as RDF identifiers.

The ontology of the knowledge base 12 provides a model of the business system 10 by interrelating entries in the knowledge base 12 to provide an organization and representation of the physical business system 10. The ontology defines and models entities such as spaces (e.g., physically-delimited areas such as sites, buildings, floors, etc.), equipment (e.g., mechanical devices that compose a system (e.g., chillers, AHUs, access doors, etc.)), devices (e.g., electronic devices that provide I/O or data elaboration functionality (e.g., actuators, systems on a chip, sensor devices, etc.)) and information objects (e.g., information entities associated with devices and possibly representing inputs, outputs, configuration parameters, events, etc.). The building system model is encoded in a machine-processable ontology language, describing building entities and relationships relevant to each addressed domain (e.g., HVAC, building transportation, security, safety). The implementation of such a reference model may rely on formal/logic-based languages (e.g., OWL/RDF, description logics, datalog variants, F-logic) that enable automated inference and efficient query capabilities.

Access to the knowledge base 12 may be made through semantic query languages, such as SPARQL. An example embodiment can be based on the use of RDF as generic data model for the representation of the building systems as semantic graphs, where various entities occurring in the building systems are related to each other and mapped to the ontology according to a linked data architecture. Examples of information provided by the ontology of the knowledge base 12 include, but are not limited to, the structure of a building (floors, room, etc.); the devices installed in the building located into spaces; relationships among equipment pieces (e.g., a specific air handling unit serves a specific variable air volume box); an annotated description of I/O, commands and configurable parameters provided by each device, together with the related source system addressing information. It is understood that the ontology of the knowledge base 12 may define and model a wide variety of entities, and embodiments are not limited to the examples provided in this disclosure.

Figure 3:
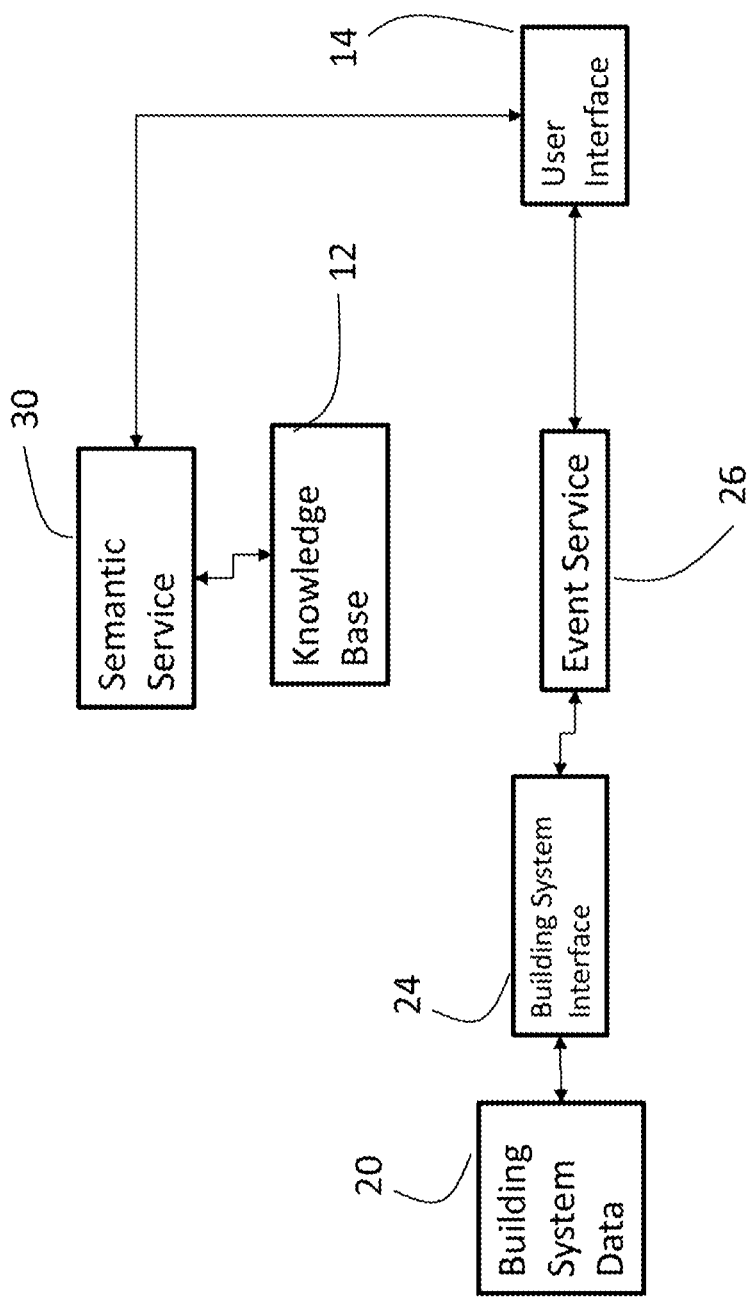
FIG. 3 depicts components for providing event filtering and event reporting in an embodiment.

FIG. 3 depicts components for both reading and writing building system data in an embodiment. Building system data 20, including event data, is data generated by or used by the building system 10. The building system data 20 includes, but is not limited to, how components of the building system are arranged (e.g., physical layout and relationships), measurements of variables, control values for set points, event data, etc. A building system interface 24 provides a communication interface between building system components and an event service module 26. The building system interface 24 may include a variety of interfaces to communicate with disparate building systems. For example, a first interface may communicate with an elevator system and a second interface may communicate with a security system.

The event service module 26 may be implemented by a software application executing on a microprocessor-based device having a memory, such as a computer server. The event service module 26 abstracts with a unique and universal interface a variety of systems and permits receiving event data from a variety of devices in the building system 10. The event service module 26 uniquely addresses data points and receives event data through an integration bus where system-specific connectors and low-level drivers may be connected.

A semantic service module 30 may be used to create commands for interfacing with the knowledge base 12 in a format recognized by the knowledge base 12. The semantic service module 30 may be embodied on a microprocessor-based device having a memory, such as a computer server. In one embodiment, the semantic service module 30 may serve as a RESTful endpoint to provide GET, PUT, POST or DELETE commands in a format recognized by the knowledge base 12. The semantic service module 30 provides semantic facilities for allowing the user interface 14 to identify the filter criterion for an event filter formulated in a way that is independent from the type or domain of any individual system. The semantic service module 30 is built on top of a query engine exploiting the semantic knowledge-base 12, which provides a reconciled, integrated and linked view of building system data sources across different domains.

The user interface 14 provides an interface to both the semantic service module 30 and the event service module 26. Both creation of the event filter and reporting event data matching the event filter criterion may be initiated from the user interface 14, as described in further detail herein. The user interface 14 can coordinate operations by the semantic service module 30 and the event service module 26. In some embodiments, the user interface 14 will issue one request to the semantic service module 30 and the event service module 26, which will then implement event filtering. In other embodiments, the user interface 14 interacts with the semantic service module 30 and the event service module 26 commanding operations in sequence.

Figure 4:
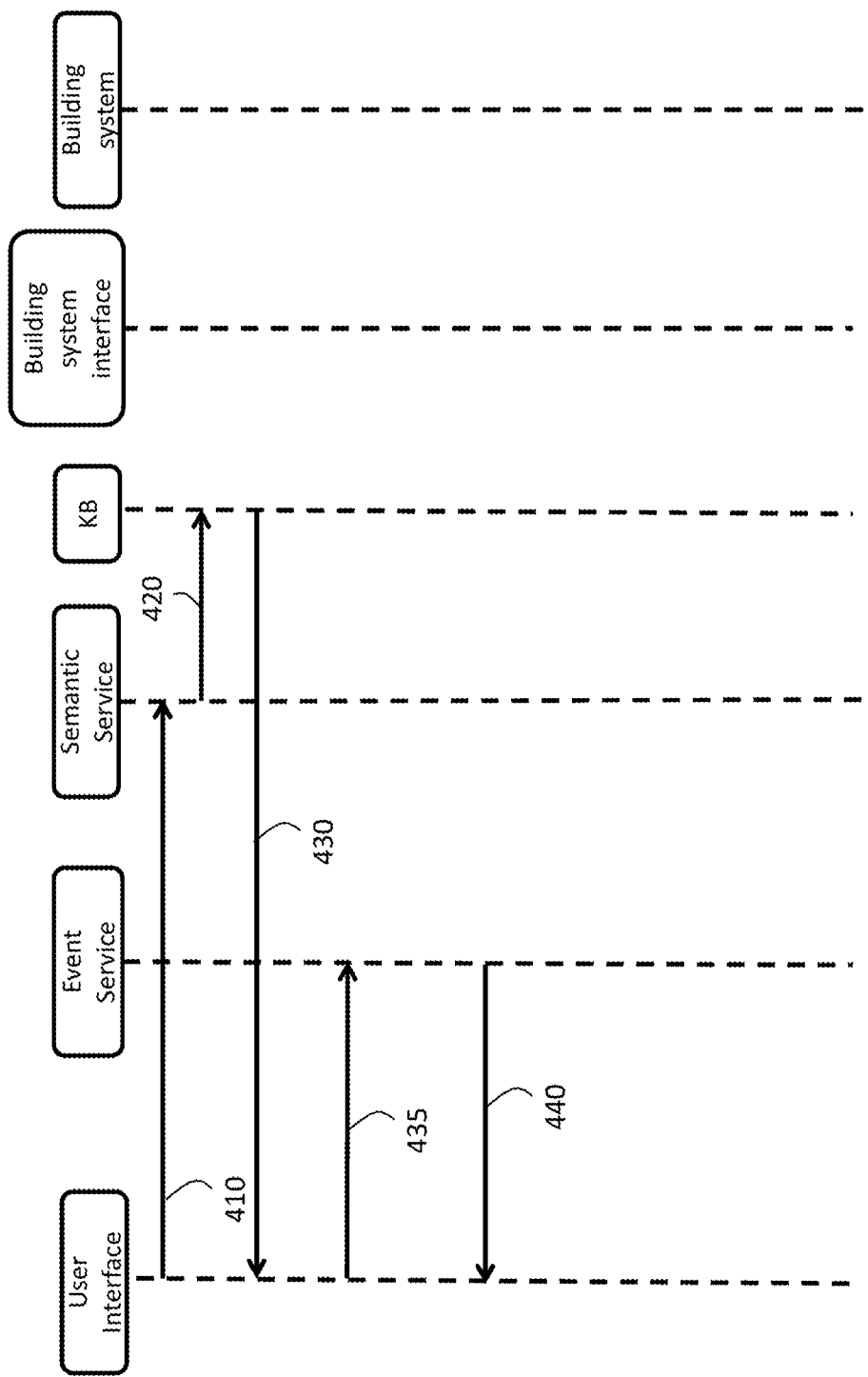
FIG. 4 depicts a process flow to create an event filter in an embodiment.

FIG. 4 depicts a process flow to create an event filter in an embodiment. At 410, a user request to create an event filter is issued to the semantic service module 30 by the user interface 14. In the example of FIG. 4, the user request is a semantic search request to identify event data filtered according to properties defined in the ontology, e.g., "get all alarms related to water temperature of chillers." The user request provides one or more filter criterion used to filter the event data. For example, one criterion may be alarms related to water temperature of chillers. Another criterion may be a location, such as, chillers in zone 4. A singular criterion is used in the description of FIGS. 4 and 5, but it is understood that a wide variety and number of filter criterion may be used to filter the event data At 420, the semantic service module 30 accesses knowledge base 12 to retrieve event data entries matching the user request. The semantic service module 30 converts the user filter criterion to a form compatible with searching knowledge base 12.

At 430, the knowledge base 12 provides metadata from event data entries matching the user filter criterion to the user interface 14. The metadata related to the matching filter criterion in knowledge base 12 may include addressing information to identify the event source through the event service; characterization of the observable event (e.g., temperature, running status); related "tags" (e.g., chilled_water_leaving); type of event source (e.g., change-of-value, alarm, notification); communication protocol used to access the building system (e.g., analog input, binary value); capabilities and allowed values.

If the user filter criterion results in no entries in the knowledge base 12, then an error message may be generated by either the semantic service module at 410 or by the knowledge base 12 at 420. For example, the user may submit event filter criteria requesting unauthorized access attempts for a main lobby. However, the main lobby main be an open public space, meaning that there will be no unauthorized access attempts. In such cases, the semantic service module 30 or knowledge base 12 will notify the user interface 14 at 430 that the event filter criterion does not exist in the event data in the knowledge base 12. At 435, the user interface 14 sends a request to create an event filter to the event service module 26 based on the meta-data retrieved from the knowledge base at 430, which encode the filter criteria identified at 410.

The request may include a reporting period for reporting event data, such as report event data in real time, report event data once a day, once a week, etc. At 440, the event service module 26 creates the event filter, including the reporting period and send an acknowledgement to the user interface 14 that the event filter has been created.

Figure 5:
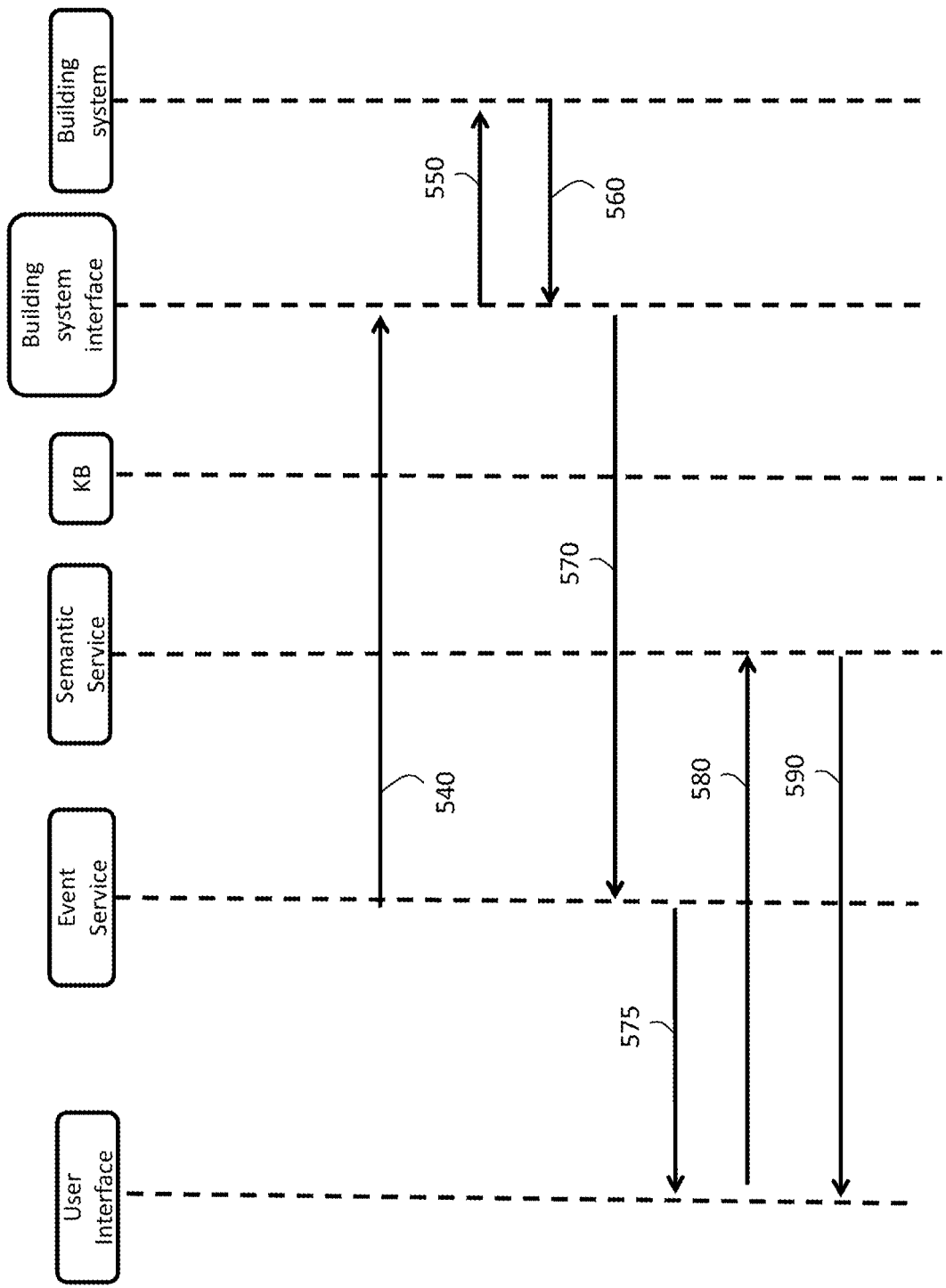
FIG. 5 depicts a process flow to report events in accordance with the event filter in an embodiment.

FIG. 5 depicts a process flow to report event data in accordance with the event filter in an embodiment. FIG. 5 depicts processing that occurs once an event filter has been created using the process of FIG. 4. At 540, the event service module 26 accesses the building system interface 24 to access the building system data, including event data. The event service module 26 uses metadata to access the building system interface 24 to access the event data. At 550, the building system interface 24 accesses the physical building system 10, which replies with the requested event data at 560. At 570, the building system interface 24 sends the retrieved event data to the event service module 26. The event service module 26 may collect event data in real time or periodically (e.g., once every 5 minutes).

At 575, the event service module 26 sends event data retrieved from the building system interface and matching the filter criterion to the user interface 14. The event data is sent to the user interface 14 in accordance with the reporting period (e.g., once per day) identified in the request to create the event filter. The user interface 14 receives the event data from the event service module 26 in a building format of the building system 10. At 580, the user interface 14 accesses the semantic service module 30 to achieve a semantically normalized representation of the data received at 575, i.e., to convert the event data from the building format of the building system 10 to a semantic format interpretable by a user. For example, the event filter may request all alarm events associated with a chiller. The value returned at 570 may be a binary representation of an alarm (e.g., 01, 10 or 11). The processing at 580 converts the building system data from the building system format to a semantic format. In this example, the semantic service module 30 determines that the building system format of "10" corresponds to semantic format of "mid-level alarm." At 590, the event data in the semantic format is provided to the user interface 14 (i.e., the user interface indicates that a mid-level alarm occurred).

Embodiments provide a number of benefits including the use of a single user interface to define semantic events across multiple domains (e.g., HVAC, security, transportation, etc.), in order to identify event data matching particular features. The user interface provides a unique workflow, common to all building systems to access, normalize and control heterogeneous devices' event data, therefore focusing on the actual value proposition. Embodiments leverage querying and inferences execution performance with specific semantics-based techniques.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is as follows:

1. A building management system comprising:
a building system interface configured to access a building system;
an event service module configured to access event data in the building system through the building system interface;
a knowledge base providing a model of the building system, the model including semantic descriptions of the event data, the semantic descriptions of the event data being arranged in an ontology;
a semantic service module in communication with the knowledge base; and
a user interface in communication with the semantic service module and the event service module, the user interface generating a user request to create an event filter having a filter criterion and report the event data matching the filter criterion;
wherein creating the event filter comprises:
issuing, to the semantic service module by the user interface, the user request to create the event filter;
the semantic service module accessing the knowledge base to retrieve the event data matching the user request,
the knowledge base providing metadata from the event data matching the filter criterion to the user interface;
the user interface sending the user request to create the event filter to the event service module based on the metadata retrieved from the knowledge base; and
the event service module creating the event filter.

2. The building management system of claim 1, wherein the user interface sends the user request to the event service module to report the event data matching the filter criterion.

3. The building management system of claim 2, wherein the event service module sends the user request to the building system interface to retrieve the event data matching the filter criterion.

4. The building management system of claim 3, wherein the building system interface sends the event data matching the filter criterion to the event service module.

5. The building management system of claim 4, wherein the event service module sends the event data matching the filter criterion received from the building system interface to the user interface.

6. The building management system of claim 5, wherein the user interface accesses the semantic service module to convert the event data matching the filter criterion received from the event service module from a building system format to a semantic format.

7. The building management system of claim 6, wherein the semantic service module forwards the event data matching the filter criterion received from the user interface in the semantic format to the user interface.

8. The building management system of claim 1, wherein the user request to create the event filter includes a reporting period.

\* \* \* \* \*